(12) United States Patent
Usami

(10) Patent No.: US 6,430,647 B1
(45) Date of Patent: *Aug. 6, 2002

(54) DATA PROCESSING SYSTEM FOR USE IN CONJUNCTION WITH A FONT CARD OR THE LIKE

(75) Inventor: Hajime Usami, Nagoya (JP)

(73) Assignee: Brother Kogyo Kabushiki Kaisha, Aichi-ken (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/184,379

(22) Filed: Nov. 2, 1998

(30) Foreign Application Priority Data

Oct. 31, 1997 (JP) ............................................. 9-301307

(51) Int. Cl.7 ............................. G06F 13/40; G06F 12/00
(52) U.S. Cl. ............................. 710/307; 711/5; 711/115
(58) Field of Search ..................... 710/66, 127, 307; 711/5, 115

(56) References Cited

U.S. PATENT DOCUMENTS

| | | | | | |
|---|---|---|---|---|---|
| 4,716,527 A | * | 12/1987 | Graciotti | ....................... | 703/25 |
| 4,860,198 A | * | 8/1989 | Takenaka | ....................... | 710/127 |
| 5,034,879 A | * | 7/1991 | Woodward et al. | ....................... | 712/247 |
| 5,070,445 A | * | 12/1991 | Woodward | ....................... | 710/66 |
| 5,539,912 A | * | 7/1996 | Clarke, Jr. et al. | ....................... | 710/104 |
| 5,548,766 A | * | 8/1996 | Keaneko et al. | ....................... | 710/127 |
| 5,802,392 A | * | 9/1998 | Epstien et al. | ....................... | 710/4 |
| 5,835,960 A | * | 11/1998 | Keene et al. | ....................... | 711/172 |
| RE36,052 E | * | 1/1999 | Kobayashi et al. | ....................... | 710/127 |
| 6,101,565 A | * | 8/2000 | Nishtala et al. | ....................... | 710/307 |

FOREIGN PATENT DOCUMENTS

| | | |
|---|---|---|
| JP | 3240144 | 10/1991 |
| JP | 4085639 | 3/1992 |

\* cited by examiner

Primary Examiner—Jack Choules
(74) Attorney, Agent, or Firm—Pitney, Hardin, Kipp & Szuch LLP

(57) ABSTRACT

A data processing system provided with a CPU for reading at units of 32 bits per read cycle, a font card that requires read accesses of either 16 or 8 bits per cycle by accessing a specific address area, and an address specifying control circuit positioned between the CPU and font card. When accessing the specific address area, the CPU provides information on the data width for access and the low-order portion of the address to the address specifying control circuit. Based on this data, the address specifying control circuit outputs the low-order portion of the address to the font card for accessing the font card at the prescribed unit of bits, regardless of the address data output from the CPU. For example, when performing a 16 bit read, the second to lowest order bit (ADR01) is set to 0 in the first read cycle, and the low-order 16 bits of data is considered valid. In the second read cycle, ADR01 is set to 1, and the high-order 16 bits of data is considered valid. The address accessed by the CPU is the same for both the first and second read cycles.

12 Claims, 9 Drawing Sheets

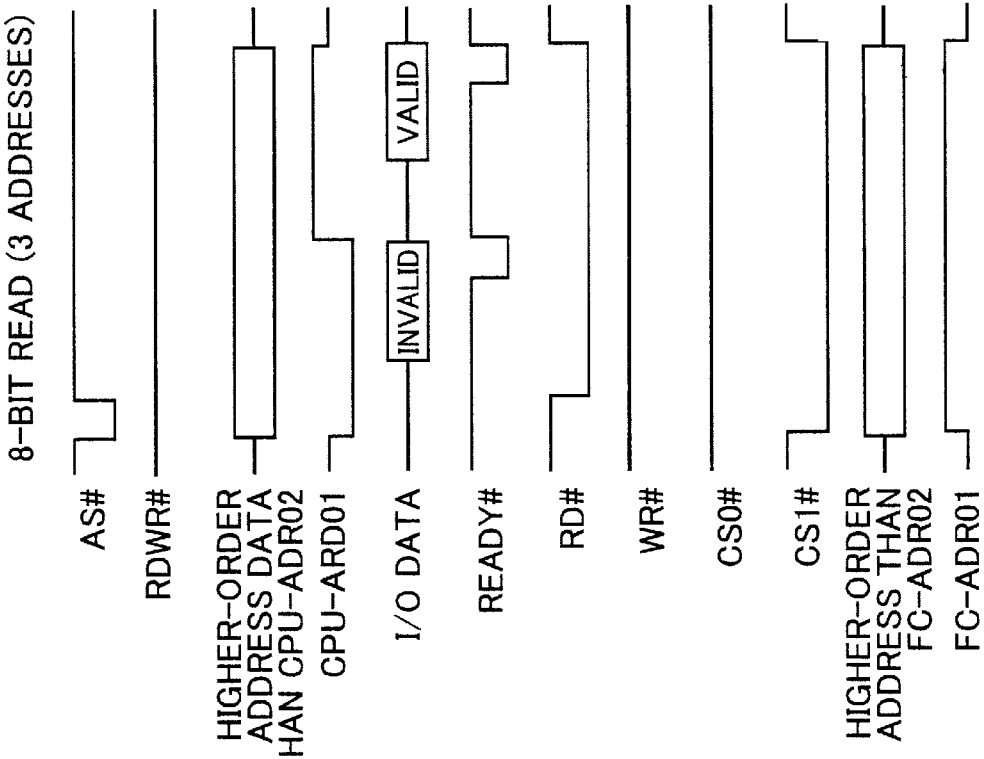
FIG.8(b) 8-BIT READ (3 ADDRESSES)
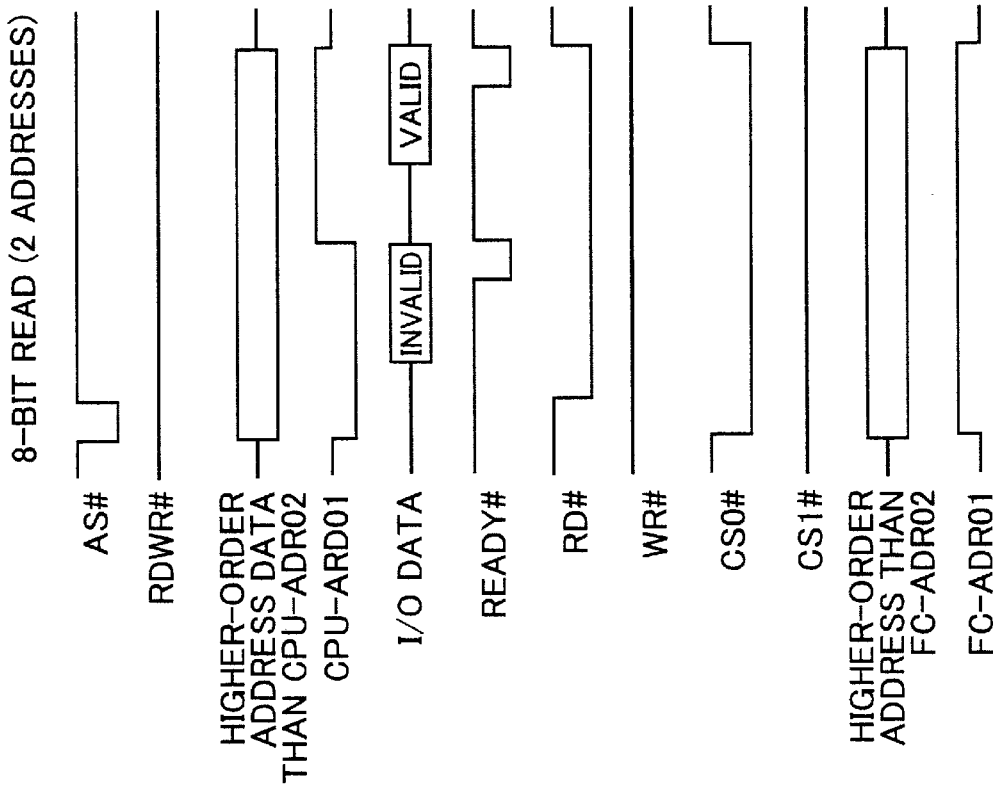
FIG.8(c) 8-BIT READ (2 ADDRESSES)

DATA PROCESSING SYSTEM FOR USE IN CONJUNCTION WITH A FONT CARD OR THE LIKE

BACKGROUND OF THE INVENTION

1. Field of the Invention

The present invention relates to a data processing system provided with control devices such as a CPU and ASIC, and freely detachable storage devices such as font cards.

2. Description of the Prior Art

Conventional data processing systems provided with a CPU include a program ROM for storing control programs used by the CPU to execute prescribed control processes; data ROM for storing data to be referenced during those control processes: RAM that serves as a work area during those control processes for performing input and output of data: I/O interface for executing in hardware data input and output between external devices; and the like.

Each of these storage devices contains storage space that can be accessed by the CPU. Addresses are assigned for the storage spaces of each storage device such that the addresses do not overlap. The CPU can access each of the storage devices by outputting the relevant address data.

However, the storage space contained in individual storage devices is generally smaller than the total address space that can be accessed by the CPU. Therefore. an address decoder is normally positioned between the CPU and the storage devices. The address decoder executes processes to generate the address of each storage device based on address data outputted from the CPU.

Occasionally, the width of the I/O data bus used by the CPU is different from that of the data bus for the storage devices. Therefore, some conventional systems employ a configuration in which a plurality of storage devices are arranged together and made to conform to the I/O data width of the CPU using the address decoder.

For example, a 32-bit CPU has a 32-bit data bus. However, the data buses in the program ROM and data ROM currently have a maximum width of 16 bits. Hence, conventional systems have used the two ROM devices together to form a 32-bit data bus width.

In addition to program ROM and other storage devices that are preinstalled in the data processing system, there are other storage devices called card ROM, such as font cards and the like, which are detachably inserted in the data processing system. These card ROM are designed to suit the CPU data bus width of the data processing system that uses such card ROM. For example, a data processing system such as a printer system provided with a 32-bit CPU uses font cards having a data bus width of 16 bits.

Accordingly, the CPU of the printer system cannot easily read the font card simply by mounting the font card in the card connection section provided in the printer system. Rather, a process is performed to read 16 bits of data from the card twice in one read cycle.

However, some types of card ROM such as the font card mentioned above require that read accesses are performed by accessing a prescribed area of the total address area and by reading 8 bits or 16 bits of data per read cycle.

In addition, some types of CPU are,capable of writing data to storage devices at 8, 16, or 32 bits, but can only read data from such storage devices in units of 32 bits. This is particularly common in cache memory provided in the CPU.

Hence, if a card ROM requiring data to be read at 16 bits by accessing a restricted portion of address area is used in a data processing system provided with a CPU that can only read data in units of 32 bits, it is not possible to read data from the prescribed portion of memory when performing two reads in one read cycle.

SUMMARY OF THE INVENTION

In view of the foregoing, it is an object of the present invention to provide a data processing system capable of reliably reading data from a part of memory, even when a storage device that requires data to be read at a data bus width smaller than the width of the system data base is used in a data processing system provided with a CPU that can only read data at the maximum data bus width of the system.

This and other objects of the present Invention will be attained by a data processing system including a data processing device for reading process data from an external device at a first bit width; a connection device for connecting the data processing device with a storage device when the storage device is mounted in the connection device. wherein the storage device is detachably mounted and has a reduced bus size with which process data is read at a second bit width that is smaller than the first bit width; and an address specifying data control device for outputting via the connection device at least a portion of data specifying an address for a storage area in the storage device, based on prescribed instruction data from the data processing device.

The data processing device includes an address specifying data output device for outputting data that specifies an address of a standard storage area, in which at least process data of the first bit width is stored within the storage device; an valid process data extraction device for extracting valid process data of the second bit width based on process data read at the first bit width corresponding to data specifying an address, when specifying an address in the standard storage area equivalent to an area of the reduced bus size, and a partial storage area selection device for selecting a desired partial storage area in the standard storage area equivalent to an area of the reduced bus size in which data of the second bit width is stored, and outputs selection instruction data.

With this construction, the address specifying data control device generates at least one part of the data for specifying the address of a partial storage area based on the selection instruction area and outputs the address to the storage device via the connection device With this construction, when the address specifying data output device of the data processing device specifies the address of a standard storage area corresponding to a reduced bus size area and in which process data of the first bit width is stored, the partial storage area selection device selects a desired partial storage area in the standard storage area In which data of the second bit width is stored, and outputs selection instruction data to the address specifying data control device. Based on this selection instruction data. the address specifying data control device generates at least one portion of data for specifying the address of the partial storage area and outputs that address data to the storage device mounted in the connection device.

Regardless of the address in the storage device that the data processing device specifies with address specifying data, a partial storage area storing data of the second bit width is selected and data of the partial storage area is output. Since the second bit width is smaller than the first bit width, output of the second bit width is performed a plurality of times to form the equivalent of the first bit width. The valid process data extraction device of the data processing device extracts valid process data of the second bit width based on process data read at the first bit width. Hence, data of the second bit width is included a plurality of times within data read at the first bit width. However, since only the valid portion of the second bit width is extracted, in effect an appropriate read at the second bit width is achieved.

In another aspect of the invention, the selection instruction data includes data specifying a portion of the address for the partial storage area.

With this construction. the partial storage area selection device outputs selection instruction data that includes data specifying a portion of the address for the partial storage area. Hence. a special address specification corresponding to a specific bit width need not be specified using address specifying data of the data processing device, even when the storage device mounted in the connection device requires that data for a specific area be read at a specific bit width. As a result. it is possible to minimize the changes to software.

In another aspect of the invention. the selection specifying data includes data for specifying the second bit width.

With this construction, the partial storage area selection device outputs selection instruction data including data for specifying the second bit width. Accordingly. even when the data processing device outputs fixed address specifying data. the low-order address equivalent to the second bit width changes each time a read is performed on the storage device. Hence, even when the second bit width of the storage device changes according to the address area, an access can be performed at an appropriate address corresponding to the second bit width set at each area.

In another aspect of the invention, the first bit width is a multiple of the second bit width. The address specifying data control device generates address data at a bit number capable of expressing the multiple value, and outputs this address data to an address bus of the storage device via the connection device.

With this construction, the address specifying data control device generates address data based on the selection instruction data. However, this address data includes a bit number that can express the multiple value of second bit widths necessary to form the first bit width Hence, it is possible to reliably obtain data of the first bit width by reading data at the second bit width a number of times equivalent to the multiple value. As a result. the system can guarantee a reliable data read, even when the data processing device can only perform reads at the first bit width.

In another aspect of the invention, the address specifying data control device generates at least a portion of the data for specifying the address of the partial storage area based on the selection instruction data and data specifying either an even or odd address, and outputs the data to the storage device via the connection device.

With this construction, the address specifying data control device generates and outputs at least a portion of the data for specifying the address of the partial storage area based on selection instruction data. However, in addition to this address data, the address specifying data control device also generates data specifying either an even or an odd address and outputs this data to the storage device via the connection device. Hence, it is possible to reliably read data at the second bit width without changing the hardware configuration, even when the second bit width required for the storage device covers a plurality of values.

BRIEF DESCRIPTION OF THE DRAWINGS

The above and other objects, features and advantages of the present invention will become more apparent from the following description when taken in conjunction with the accompanying drawings, in which:

FIG. 7($b$) is a timing chart showing the timing of various signals for the storage device during a low-order 16-bit read cycle;

FIG. 8($b$) is a timing chart showing the timing of various signals for the storage device during a high-order 8-bit read cycle:

FIG. 8($c$) is a timing chart showing the timing of various signals for the storage device during a low-order 8-bit read cycle; and FIG. 8($d$) is a timing chart showing the timing of various signals for the storage device during the lowest-order 8-bit read cycle.

DETAILED DESCRIPTION OF THE PREFERRED EMBODIMENT

Figure 1:
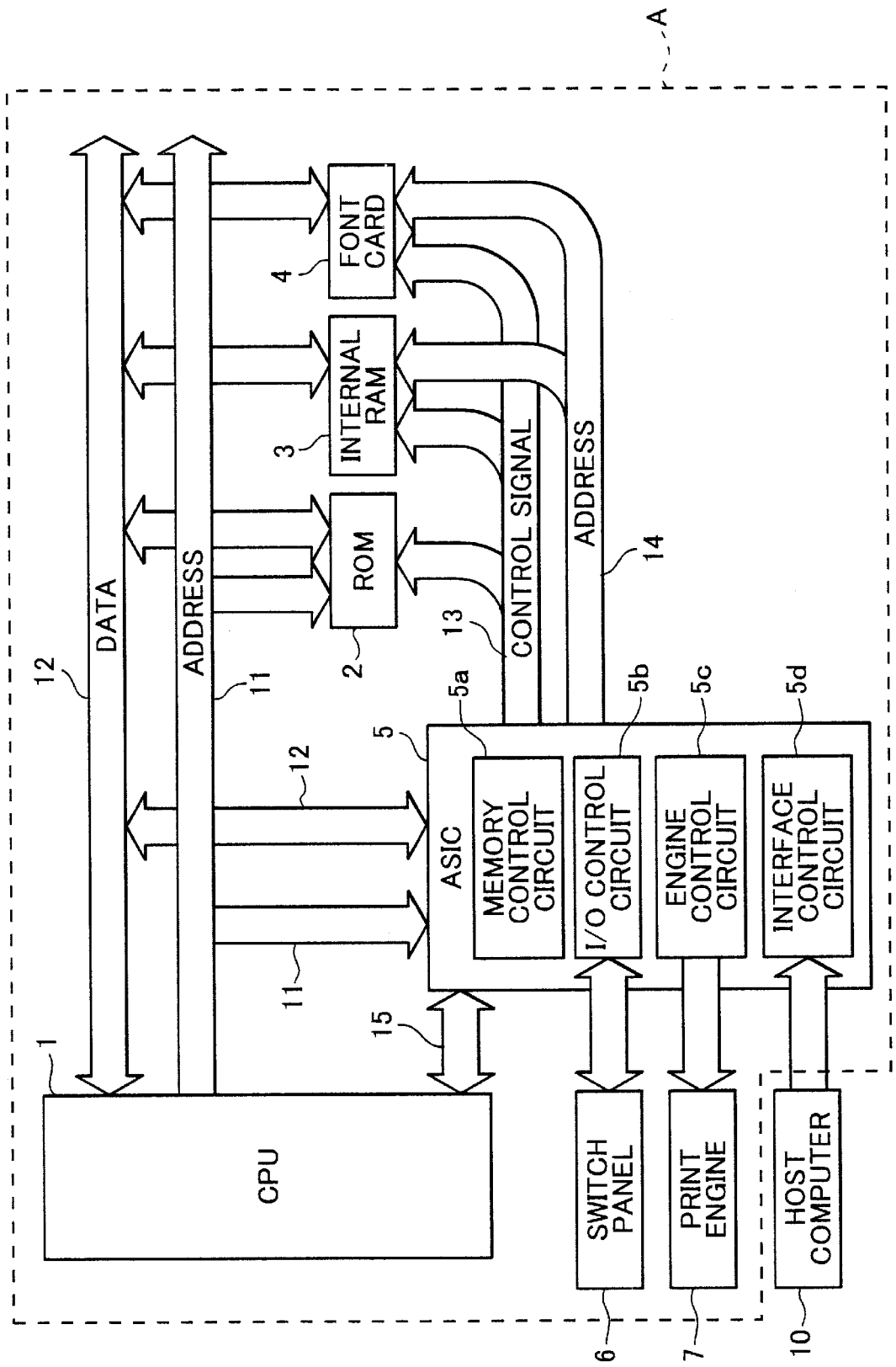
FIG. 1 is a block diagram showing the general construction of a data processing system according to a preferred embodiment of the present invention.

A data processing system according to a preferred embodiment of the present invention will be described while referring to the accompanying drawings. FIG. 1 shows the general construction of a print system, which Is the data processing system of the present embodiment.

This print system is constructed of a printing device A, encircled by the dotted line in FIG. 1, and a host computer 10, which is a personal computer or the like connected to the printing device A. Print data output from the host computer 10 is stored temporarily in a RAM device of the printing device A. The printing device A performs a print operation by outputting video data generated based on this print data to a suitable printing engine.

Next, the construction of the printing device A will be described with reference to FIG. 1.

As shown in FIG. 1, the printing device A includes a CPU 1 for controlling various components of the printing device A; a ROM 2 for storing control programs and the like; an Internal RAM 3 for providing the CPU 1 with a work area; a font card 4 for storing font data: an Application Specific Integrated Circuit (ASIC) 5 for reducing the processing load of the CPU 1; a switch panel 6 for displaying messages and settings; and a print engine 7 for forming images on a recording paper.

The CPU 1 controls the various components of the printing device A, performing such operations as outputting address data, inputting and outputting data between components assigned by the address, and inputting and outputting control signals for each component. The CPU 1 of the present embodiment employs a 32-bit data bus.

The ROM 2 is a memory device for storing control programs for the operations described above. In addition to executable programs, the ROM 2 stores table data and the like.

The internal RAM 3 is a storage device serving as both the main memory of the data processing system and as a work area required by the CPU 1 for performing calculations. The internal RAM 3 of the present embodiment is Dynamic Random Access Memory (DRAM).

The font card 4 is detachably mounted in a card slot (not shown) and functions as memory for storing font data.

The ASIC 5 is an IC circuit specific to this data processing system and is provided to perform data processing with the CPU 1 according to the present invention. The ASIC 5 includes a memory control circuit 5a for controlling the ROM 2 and internal RAM 3, as well as the font card 4: an I/O control circuit 5b for controlling the switch panel 6; an engine control circuit 5c for controlling the print engine 7: and an interface control circuit 5d for controlling communications with the host computer 10.

The CPU 1 inputs address data. I/O data, or control signals to each of the control circuits in the ASIC 5, where the data or control signals are processed or output to various devices.

The switch panel 6 includes a display device provided in a panel on the printing device A, switches, and the like. The switch panel 6 enables the operations of the printing device A to be set through operations of the switches, and displays error messages and the like on the display device.

The print engine 7 is an image forming device using either an electrophotographic method or an Ink-jet method. The print engine 7 forms images on a recording paper based on video data output from the engine control circuit 5c.

Next, a memory map used in the print system above will be described with reference to FIG. 2.

Figure 2:
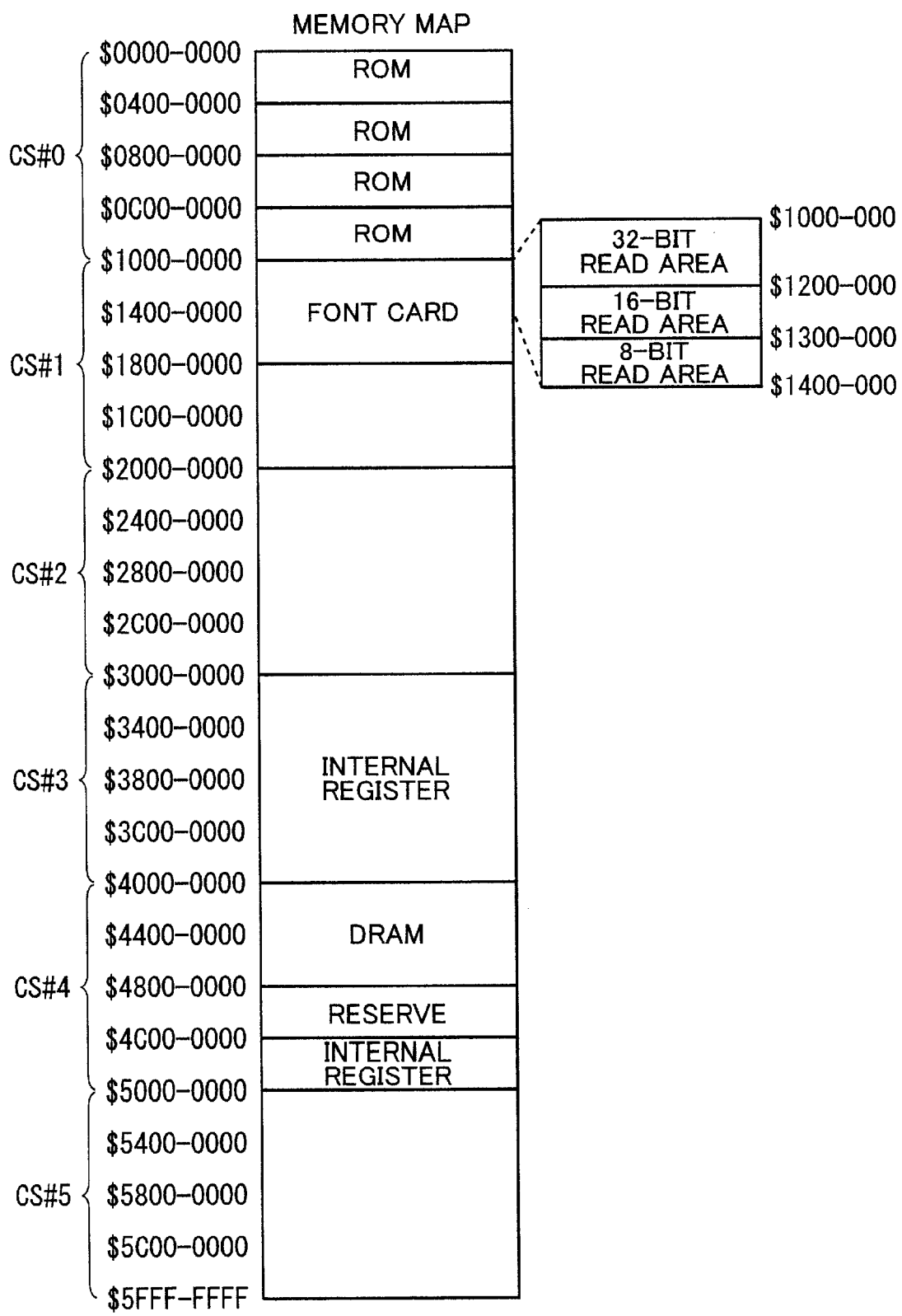
FIG. 2 is an explanatory diagram showing a memory map for the data processing system in FIG. 1.

As shown in the memory map of FIG. 2, a 256-MB memory area from addresses 00000000 to 0FFFFFFF are allocated for the ROM 2: a 128-MB memory area from addresses 10000000 to 17FFFFFF are allocated to the font card 4; and another 128-MB memory area from addresses 4000000 to 47FFFFFF are allocated to the internal RAM 3.

The printer system of the present embodiment employs two ROM 2 each with a capacity of 2M words, where a word equals 16 bits. The address areas 00000000–007FFFFF are allocated for the two ROM 2 As shown in FIGS. 1, address terminals RA0–RA20 of each ROM 2 are connected to address terminals A2–A22 of the CPU 1 via the address bus 11. When a plurality of additional ROM is provided in the same way. the ROM are selected based on a chip select signal that is output from the ASIC 5 via the control signal bus 13.

Next, the timing of signals involved in reading data stored in the ROM 2 will be described with reference to the timing chart in FIG. 3.

Figure 3:
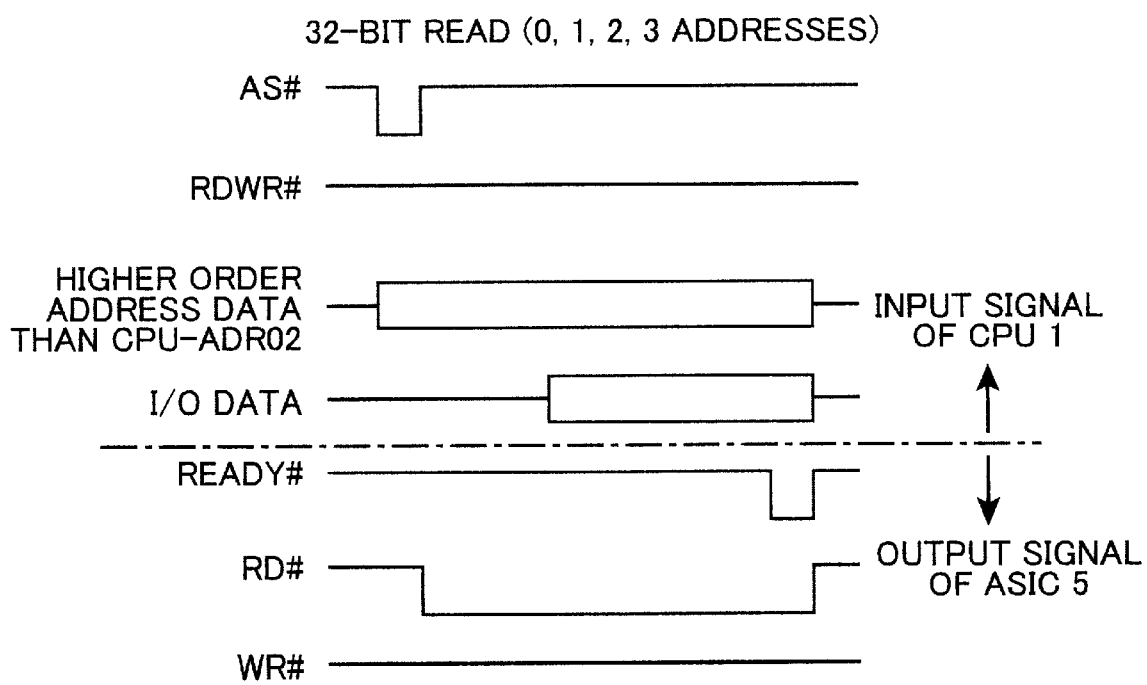
FIG. 3 is a timing chart showing the timing of various signals during a reading cycle of an ordinary ROM in the data processing system of FIG. 1.

As shown in FIG. 3. the ASIC 5 monitors an address strobe AS# output from the CPU 1 on the rising edge of the system clock signal. When the address strobe AS# is set to low level, the ASIC 5 identifies this as a signal to begin a read or write cycle. Address data output from the address terminals A2–A31 of the CPU 1 via the address bus 11 are decoded by the memory control circuit 5a, and a chip select signal is output to the ROM 2. The CPU 1 also outputs a read/write signal RDWR# via the control signal bus 15. Since this read/write signal RDWR# is set at high level, the ASIC 5 treats the cycle as a read cycle. A low-level signal at the read/write signal RDWR# indicates a write cycle. According to the timing of this identification, the read signal RD# output to the ROM 2 is set to low level. In addition, address data output from address terminals A2–A22 of the CPU 1 are provided to the ROM 2 via the address bus 11. Based on the chip select signal and read signal RD# output from the ASIC 5, the ROM 2 outputs 32-bit data to the data terminals. At a timing just after this 32-bit data is output, the ASIC 5 sets a ready signal READY# to low level in order to indicate the end of the cycle to the CPU 1. After receiving the ready signal READY#, the CPU 1 reads the 32-bit data output on the data bus 12, completing the read cycle.

The internal RAM 3 of the present embodiment includes two DRAMs having a capacity of 1M words, where one word equals 16 bits. The internal RAM 3 is allocated to the address area 40000000–403FFFFF. Read and write cycles for the internal RAM 3 are nearly the same as those for the ROM 2. However, address data output to DRAM must be multiplexed into a row address and a column address. Therefore, In the present embodiment, the ASIC 5 outputs address data to the internal RAM 3 via the address bus 14. Control signals output for the internal RAM 3 include an output enable OE#, a write enable WR#, as well as a row address strobe RAS# and a column address strobe CAS#.

Next. the font card 4 of the present embodiment will be described. A font card 4 of the present embodiment has a capacity of 64M words, where one word equals 8 bits, and is configured to be mountable in a card slot (not shown). The font card 4 is allocated to address areas 10000000–13FFFFFF. Two card slots are provided in the present embodiment. The font card 4 can be allocated to a maximum memory area of 10000000–17FFFFFF.

Accordingly, using the same method for handling the ROM 2, 32-bit font data can be obtained from the font card 4 by outputting address data for the above address area to the ASIC 5 and subsequently to the font cards.

However, since the data size of the font card is 16 bits, a different read control method from that for the ROM 2 shown In FIG. 3 is needed. In other words, it is necessary to provide control in which data is read twice at 16 bits for each read cycle.

When reading a specific address area for the font card 4 of the present embodiment. it is necessary to read data at units of 16 bits or 8 bits in one read cycle. The reason for this is that in specific areas of this font card, a memory cell pointer is provided internally. which pointer advances at intervals of 16 or 8 bits.

Figure 4:
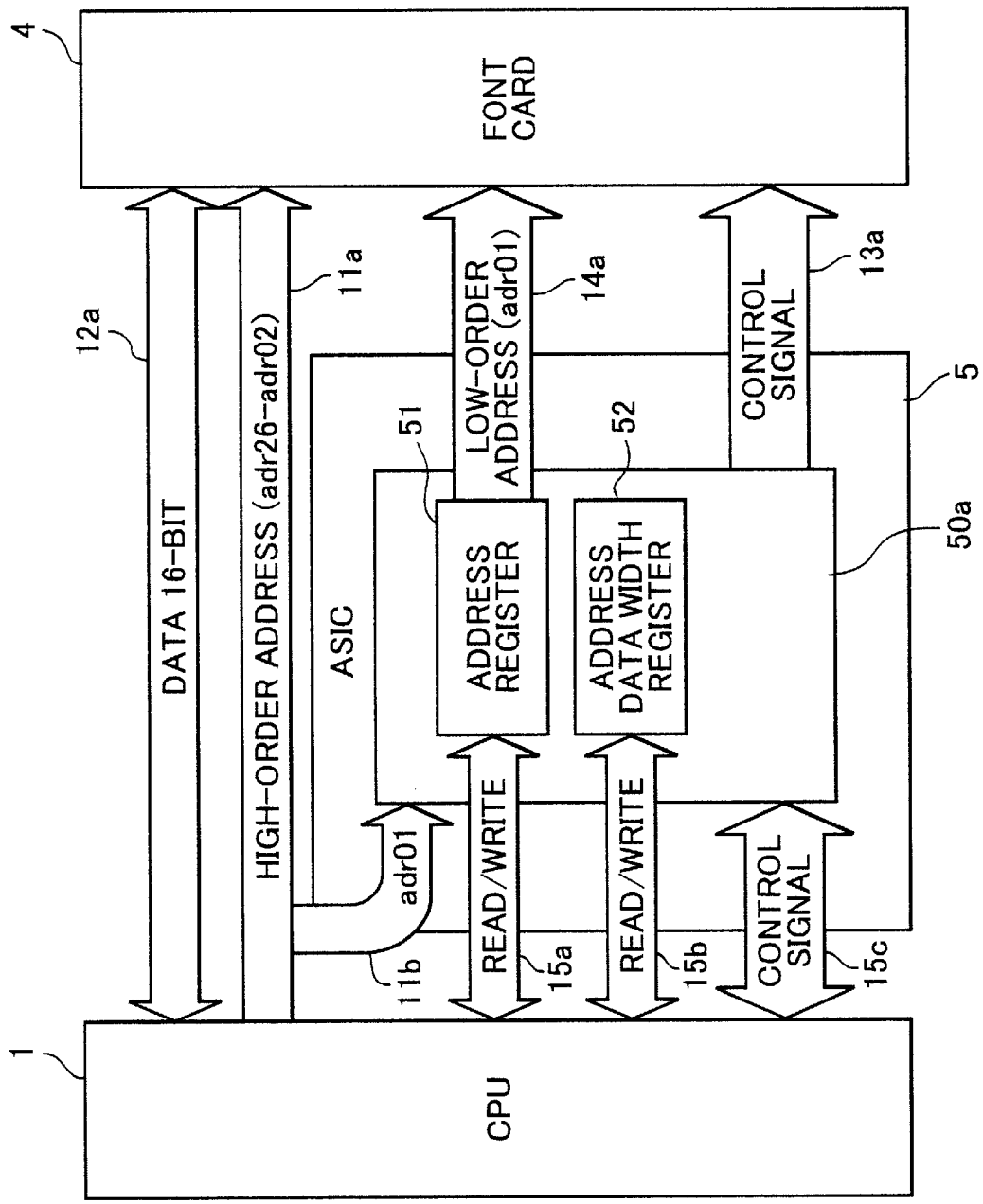
FIG. 4 is a block diagram showing the storage device and device for controlling the storage device extracted from FIG. 1.

Hence, a different control method from that for the ROM 2 is necessary in order to read data from the font card described above. As shown in FIG. 4, the memory control circuit 5a of the present embodiment is provided with a font control circuit 50a.

Next, the construction of this font control circuit 50a and the read control method for the font card 4 will be described.

As shown in FIG. 4, the font control circuit 50a includes an address register 51 and an access data width register 52. The contents of these registers can be read or write accessed by the CPU 1 via control signal buses 15a and 15b.

The access data width register 52 is a two-bit register used for setting the data width to read in one read cycle. In the present embodiment. the data width can be set to 32-bits, 16-bits, and 8-bits.

The address register 51 is also a two-bit register for setting a value used to determine the lower order two-bit value of an address at which a read cycle is performed.

The font control circuit 50*a* references values set in both the access data width register 52 and address register 51. and outputs the second to the lowest order bit (A1) of the address data for each read cycle to the font card 4 via an address bus 14*a*. Accordingly, the high-order 25 bits of address data A2–A26 are output from the CPU 1 to the font card 4 via an address bus 11*a*. In addition, the address data A1, the second to the lowest order bit, is output from the font control circuit 50*a* via the address bus 14*a*. This address data A1–A26 is provided to the address terminals FA0–FA25 of the font card 4.

The font card 4 is also provided with chip select signal terminals CS0 and CS1 for selecting either the even address area or odd address area within the two-byte area at the top of the provided address data. The font control circuit 50*a* references the values set in the access data width register 52 and the address register 51, and outputs prescribed signals to the chip select signal terminals CS0 and CS1 of the font card 4 via the control signal bus 13*a*.

Next, the control process for reading data at the various units of bits from the font card 4 according to the construction described above will be described.

As shown in FIG. 2. the data width for a reading cycle is determined in advance according to the address area for accessing the font card 4. In the present embodiment, the address area 10000000–11FFFFFF is set for reading data at a 32-bit data width; the area 12000000–12FFFFFF is set for reading data at a 16-bit data width; and the area 13000000–13FFFFFF is set for reading data at an 8-bit data width.

Figure 5:
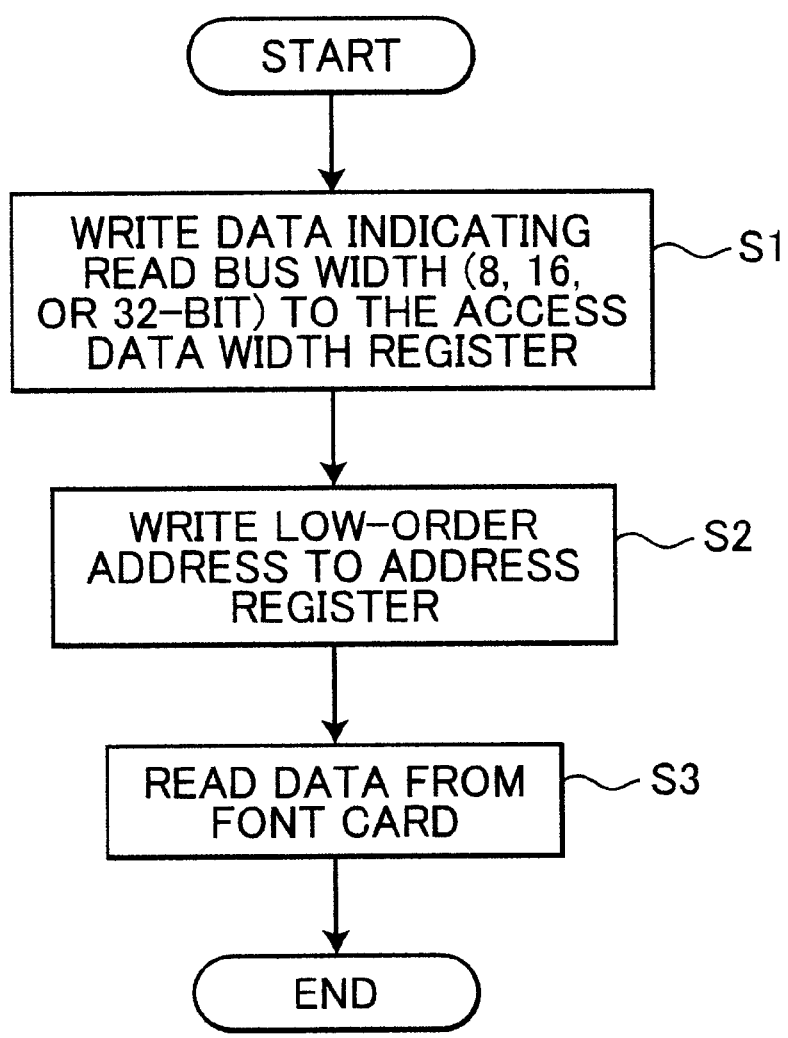
FIG. 5 is a flowchart showing the general read control process for a storage device of the data processing system in FIG. 1 that restricts the data width being read.

Regardless of the unit of bits at which data is read, the basic control process shown in the flowchart of FIG. 5 is executed. To begin with, data Indicating the read data width is written in S1 to the access data width register 52 based on the address area being accessed. Next, based on this read data width, the low-order two bits of the address to be read are output to the address register 51 in S2. Finally, in S3 data is read from the font card via a data bus 12*a*. This process will be described in more detail below.

[32-bit read]

When reading data from the address area 10000000–11FFFFFF, it is necessary to read data at a 32-bit data width. Therefore, data describing the 32-bit width is written to the access data width register 52, and the low-order bits "00" are written to the address register 51. This data is written to the registers since all 32-bits or data in each read cycle, when reading data In units of 32-bits. Also, since the address data for each read cycle advances in increments of 4, the low-order two-bit of data will always be "00".

As described above. however, the data bus width of the font card 4 is only 16 bits. Therefore, it is not possible to read 32-bits of data using the same control process as that for the ROM 2 shown in FIG. 3.

Therefore, the CPU 1 used in the present embodiment can select a data bus width for reading one cycle based on the various address areas CS#0–CS#5 shown in FIG. 2. The address area CS#1 is set for reading data at a 16-bit data bus width. All other address areas are set for reading data at a 32-bit data bus width. Data bus widths for each area are set according to internal registers of the CPU 1 and the like.

Figure 6:
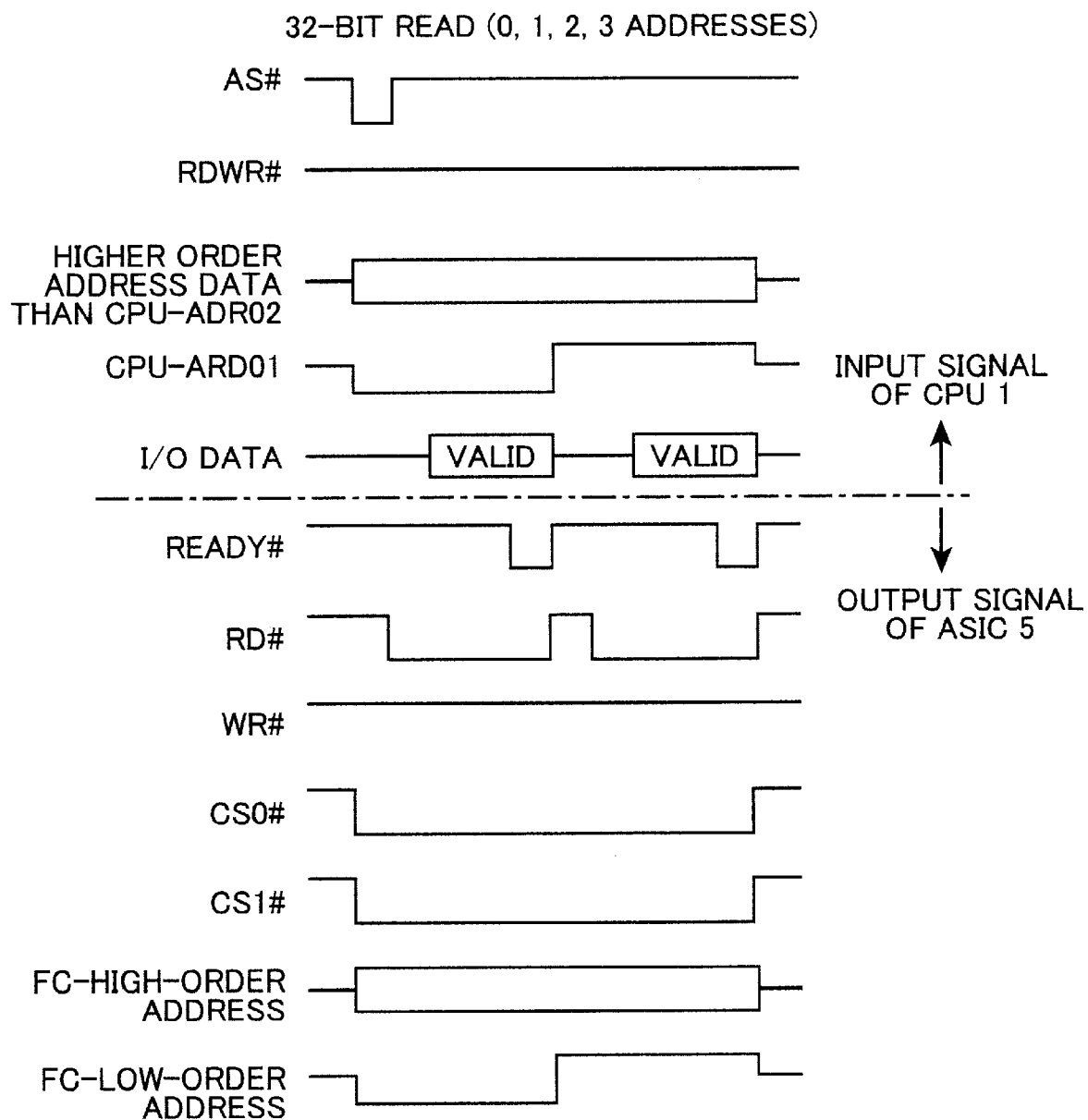
FIG. 6 is a timing chart showing the timing of various signals for a storage device with restricted data read width during a 32-bit read cycle.

FIG. 6 shows a timing chart of a read access using this type of CPU 1. For example, when accessing the address area CS#1 at 10000000, the second to the lowest order bit A1 (indicated in FIG. 6 as CPU–ADR01) is changed from 0 to 1 and output in a read cycle. This address data A1 is input via the address bus 11*a* to the font control circuit 50*a*, as shown in FIG. 4. When the value of the access data width register 52 indicates 32-bits, the font control circuit 50*a* outputs the address data A1 to the font card 4 via the address bus 14*a*, without changing the data.

In other words, the font control circuit 50*a* outputs a 0 as the address data A1 to the font card 4. The read enable RD# is switched to low level. At the timing when the 16 bits of data corresponding to this address data are output, a ready signal READY# is switched to low level for the CPU 1. In response the CPU 1 reads the high-order one byte of data as data for the address 10000000 and the low-order one byte of data as data for the address 10000001.

Since the CPU 1 outputs 1 as the address data A1, the font control circuit 50*a* outputs 1 as the address data A1 to the font card 4. The read enable RD# changed temporarily to high level is switched back to low level. At a timing when the 16 bits of data corresponding to this address data are output, the ready signal READY# is switched for the second time to low level for the CPU 1. In response the CPU 1 reads the high-order one byte of data as data for the address 10000002 and the low-order one byte of data as data for the address 10000003.

As described above, 32 bits of data can be suitably read from the font card 4 having a 16-bit data bus width in one read cycle, by switching the address data A1 and reading after each switch.

16-bit read (1) 16 Bits of Data Corresponding to 12000000 and 12000001

Next, reading from the address area 12000000–12FFFFFF will be described. In this case, It is necessary to read data in units of 16 bits for each read cycle. In other words, two read cycles are necessary to read 32 bits of data from this area.

First, data indicating a 16-bit width Is written to the access data width register 52 and the low-order bits "00" are written to the address register 51. This data is used to read a two-byte area from the address indicated by address data output from the CPU 1 in the first read cycle.

Figure 7B:
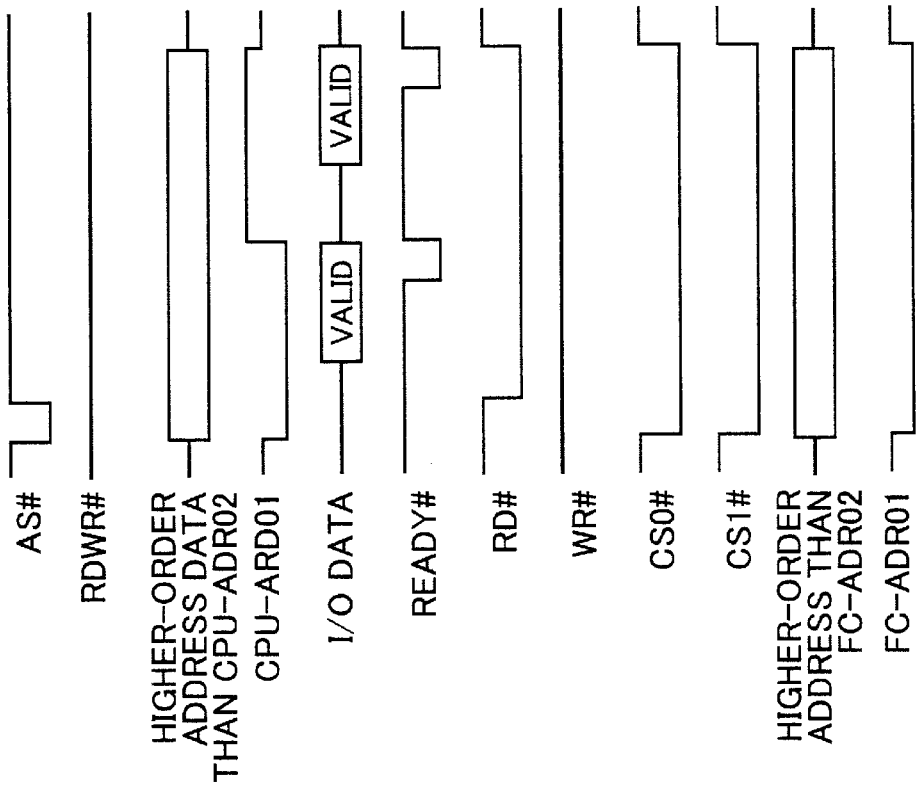
FIG. 7($a$) is a timing chart showing the timing of various signals for a storage device with restricted data read width during a high-order 16-bit read cycle.
Figure 7A:
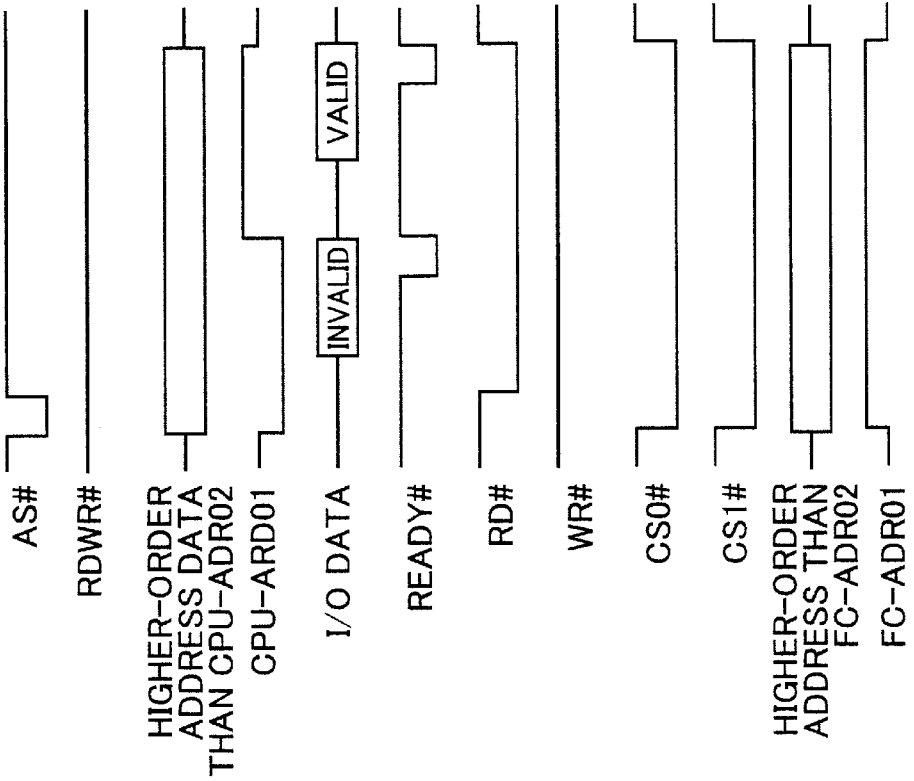

Prior to the beginning of the first read cycle, the CPU 1 sets the address register 51 and access data width register 52 as described above. After setting these registers, the CPU 1 switches the address strobe AS# to low level, as shown in FIG. 7(*a*).

For example, if the address 12000000 is set as the address data, the font control circuit 50*a* outputs 0 as the address data A1 at this time, since the value stored in the address register 51 is 00. Next, the read enable RD# is switched to low level. At a timing when 16 bits of data corresponding to this address data are output, the ready signal READY# is switched to low level for the CPU 1. In response the CPU 1 reads the high-order one byte of data as data for the address 12000000 and the low-order one byte of data as data for the address 12000001.

(2) 16 Bits of Data Corresponding to 12000002 and 12000003

Next, the CPU 1 tries to read the low-order two bytes of data and switches the address data A1 to 1. As described above, however, only 16 bits of data can be read per read cycle from the font card 4 for the address area beginning from 12000000. Therefore, the font control circuit 50a prevents a read of the low-order two bytes of data. In other words, the address data A1 is maintained at 0. Accordingly, data output from the font card 4 does not change. However, the ready signal READY# is switched to low level a second time for the CPU 1, as if giving a signal for a second read. In response, the CPU 1 again reads the high-order one byte of data as data for the address 12000002 and the low-order one byte of data as data for the address 12000003. However, the control program is configured to prevent this data from being used as I/O data.

Next, a second read cycle is executed for reading the low-order two bytes of data. In this case. however, the control program is configured such that the CPU 1 accesses the same address as the previous access period. In this example. in other words. address data for 12000000 is again output from the CPU 1. However, in contrast to the first read cycle, the address register 51 is set to the value 10. Hence. the font control circuit 50a references the value stored in the address register 51 and outputs a 1 as the address data A1 to the font card 4. Accordingly, a 0 is output from the CPU 1 as the address data A1 in the second read cycle, as shown in FIG. 7(b), but the font control circuit 50a outputs a 1 as the address data A1 for the font card 4, and the font card 4 outputs the low-order two bytes of data. At a timing when these two bytes of data are output. the ready signal READY# is switched to low level for the CPU 1. In response the CPU 1 reads the high-order one byte of data as data for the address 12000000 and the low-order one byte of data as data for the address 12000001. However, data corresponding to these addresses has already been read in the first read cycle. Therefore, the control program is configured to prevent this data from being used as I/O data.

Next. the CPU 1 outputs a 1 as the address data A1, but the font control circuit 50a continues to output a 1 as the address data A1 to the font card 4. Therefore, the output to the font card 4 does not change. Then the ready signal READY# is switched to low level a second time for the CPU 1. In response the CPU 1 reads the high-order one byte of data as data for the address 12000002 and the low-order one byte of data as data for the address 12000003. These two bytes of data are the low-order two bytes of data corresponding to the high-order two bytes of data read in the first read cycle as output from the font card 4. Accordingly, four bytes of data can be read from the font card 4 by means of two read cycles.

In this way. when accessing an area for reading data in units of 16 bits, the font control circuit 50a references the contents of the address register 51 and sets the address data A1 for output to the font card 4, regardless of address data output from the CPU 1. Therefore, it is possible to read data in units of 16 bits as prescribed by the font card 4, even though the CPU 1 can only read data in units of 32 bits for each read cycle.

8-bit reads (1) 8-Bits of Data for Address 13000000

Next, the process for reading data from the address area 13000000–13FFFFFF will be described.

In this case, it is necessary to read data in units of 8 bits for each read cycle. In other words, four read cycles are required to read 32 bits of data from this area.

To begin with, data indicating an 8-bit width is written to the access data width register 52 and the low-order bits "00" are written to the address register 51. This data is set for reading a one-byte area from the address specified according to address data output from the CPU 1 in the first read cycle.

Figure 8A:
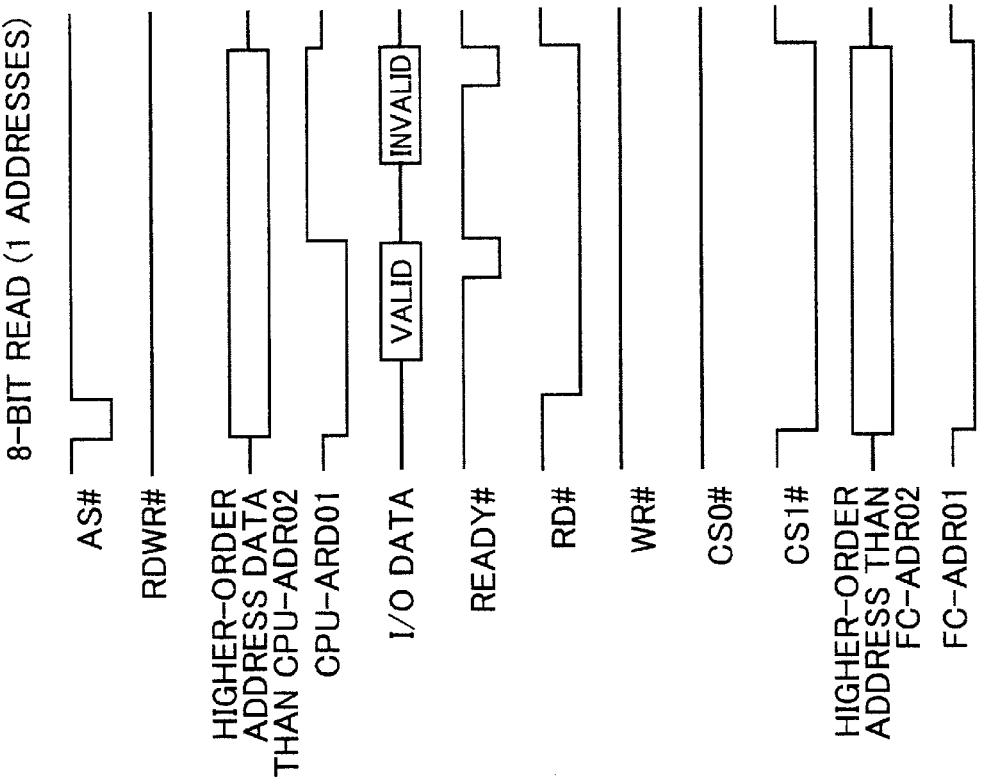
FIG. 8($a$) is a timing chart showing the timing of various signals for a storage device with restricted data read width during the highest-order 8-bit read cycle.

Prior to the beginning of the first read cycle, the CPU 1 sets the address register 51 and access data width register 52 as described above. After setting these registers, the CPU 1 switches the address strobe AS# to low level, as shown In FIG. 8(a).

For example, if the address 13000000 is set as the address data. the font control circuit 50a outputs a 0 to the font card 4 at this time as the address data A1, which is the second bit from the lowest order bit in the address, since the value stored in the address register 51 is "00". Also, the chip select signal CS0# is switched to low level and the chip select signal CS1# is maintained at high level. The meaning of these chip select signals are as follows. When the CS0# is set to low level. this signal indicates that data corresponding to the even address of the two bytes of data read in the current read cycle is output. When the CS1# is set to low level, data corresponding to the odd address of the two bytes of data read in the current read cycle are output.

Accordingly, the address data A1 is set to 0 and the chip select signal CS0# is set to low level. Hence, when the read enable RD# is switched to low level. the 8 bits of data for the even address corresponding to the address data are output.

At a timing when the 16 bits of data are output, the ready signal READY# is switched to low level for the CPU 1. In response the CPU 1 reads the high-order one byte of data as data for the address 13000000 and the invalid low-order one byte of data as data for the address 13000001. However, the control program is configured so that only the high-order one byte of data corresponding to the address 13000000 is used as I/O data.

Next. the CPU 1 tries to read the low-order second byte of data by switching the address data A1 to 1. However, only 8 bits of data can be read from the font card 4 per read cycle for the address area beginning from 13000000, as described above. Therefore, the font control circuit 50a prevents a read of the low-order two bytes of data. In other words, neither the address data A1 nor the chip select signals CS0# and CS1# are switched. The address data A1 is maintained at 0. Accordingly, data output from the font card 4 does not change. However, the ready signal READY# is switched to low level a second time for the CPU 1, as if giving a signal for a second read. In response, the CPU 1 again reads the high-order one byte of data as data for the address 13000002 and the low-order one byte of data as data for the address 13000003. However, the control program is configured to prevent this data from being used as I/O data.

(2) 8 Bits of Data for Address 13000001

Figure 8B:
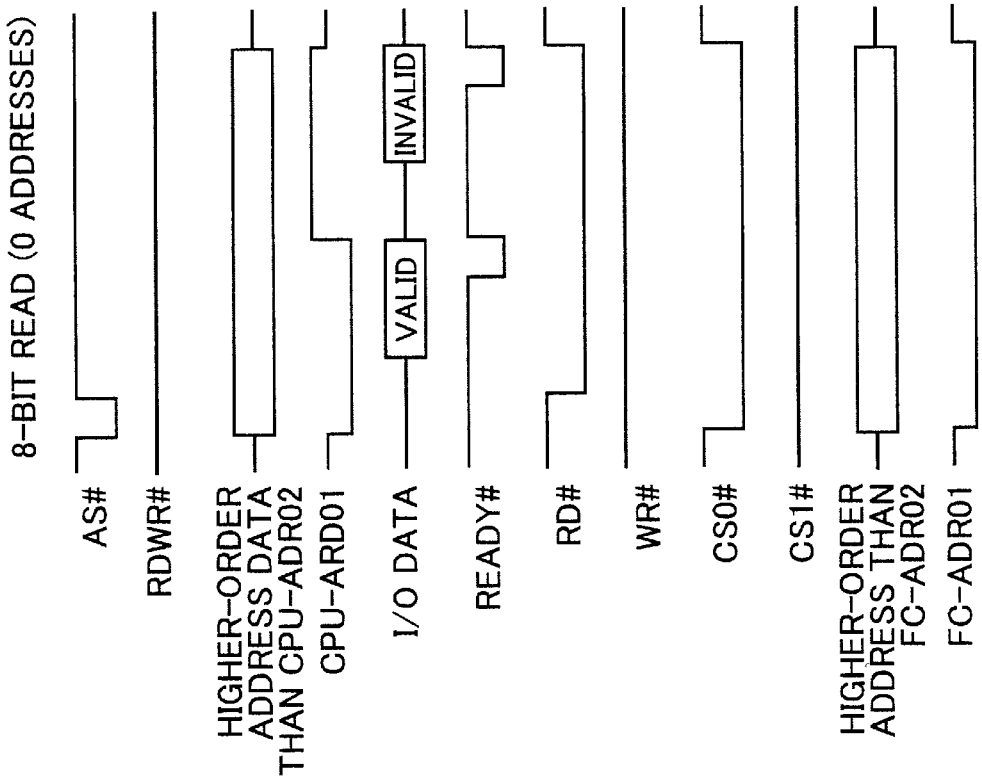

Next, a second read cycle is executed for reading one byte of data at an odd address. In this case, however, the control program is configured to force the CPU 1 to access the same address accessed in the first read cycle. In this examples in other words, address data for 13000000 is again output from the CPU 1. However, In contrast to the first read cycle, the address register 51 is set to the value 01. The font control circuit 50a references the value stored in the address register 51 and the access data width register 52 and outputs a U as the address data A1 to the font card 4. The font control circuit 50a also switches the chip select signal CS0# to high level and the CS1# to low level. Accordingly, a 0 is output from the CPU 1 as the address data A1 In the second read cycle, as shown in FIG. 8(B), and the font control circuit 50a outputs a 0 as the address data A1 for the font card 4. However, since the chip select signal CS1# is set to low level, one byte of data for the odd address is output from the font card 4. At a timing when the one byte of data for the odd address is output, the ready signal READY# is switched to low level for the CPU 1. In response the CPU 1 reads the high-order one byte of data as data for the address 13000000 and the low-order one byte of data as data for the address 13000001. However, the control program is configured so that only data corresponding to the odd address 13000001 is used as I/O data.

Next, the font control circuit 50a continues to output a 1 as the address data A1 and the chip select signals are not changed. Therefore, the output from the font card 4 does not change. The second time the ready signal READY# is switched to low level the CPU 1 reads the high-order one byte of data as data for the address 13000002 and the low-order one byte of data as data for the address 13000003. However, since the data is obtained when the chip select signal CS1# is set at low level, the control program is configured not to use data corresponding to the even address 13000002 as I/O data.0

According to the third read cycle of FIG. 8(b) and the fourth read cycle of FIG. 8(d) described above, the low-order two bytes of data among the 32 bits of data are obtained.

Hence. the total of four read cycles shown in FIGS. 8(a)–(d) obtain the entire 32-bits of data.

In this way, when accessing an address area for reading data in units of 8 bits, the font control circuit 50a references the contents of the address register 51, determines the address data A1, and outputs that data to the font card 4, regardless of the address data outputted from the CPU 1. Therefore, it is possible to read data in units of 8 bits as prescribed by the font card 4, even though the CPU 1 can only read data in units of 32 bits for each read cycle.

In the present embodiment, read accesses at units of 16 bits are achieved by performing two sequential read cycles for the high-order two bytes and the low-order two bytes. Further. read accesses at units of 8 bits are accomplished by performing four consecutive read cycles of one byte each, as described above. However, the present invention is not limited to these examples, but also applies to any one of these independent read cycles. The reason for this is that the address data A1 and chip select signals CS0# and CS1# output from the font control circuit 50a to the font card 4 in each of the above read cycles can be identified independently from the combination of the contents of the access data width register 52 and address register 51.

The table below shows the various combinations of the access data width register 52 and the address register 51.

TABLE 1

| Mode | Address register A1 A0 | Low-order address (A1) output from CPU | Low-order address (A1) output from ASIC | Chip select signal CS1 CS0 |
|---|---|---|---|---|
| 32 bits | 0 0 | 0, 1 | 0, 1 | 0 0 |
| 16 bits | 0 0 | 0, 1 | 0 | 0 0 |
|  | 1 0 | 0, 1 | 1 | 0 0 |
| 8 bits | 0 0 | 0, 1 | 0 | 1 0 |
|  | 0 1 | 0, 1 | 0 | 0 1 |
|  | 1 0 | 0, 1 | 1 | 1 0 |
|  | 1 1 | 0, 1 | 1 | 0 1 |

According to the embodiment described above, it is possible to suitably read data from a storage device that requires read accesses at units of 32, 16, or 8 bits per read cycle, even when the CPU 1 can only read at units of 32 bits per cycle. As a result, the present invention enables the use of a large variety of storage devices, such as font cards and the like, thereby allowing users to perform a wide variety of data processes in data processing systems. including the printer system described above.

The CPU used in the embodiment described above is capable of outputting two different addresses in one read cycle and reading 16 bits of data for each address. However, the present invention can also be achieved with a CPU that is not provided with this function. In this case. it is possible to perform two read cycles in order to read 32 bits from a storage device having a maximum 16-bit data bus, and to modify the value in the address register 51 for each read cycle.

When performing a 16-bit or 8-bit read cycle, an example of an order for using read data as valid I/O data is described in the embodiment above. However. the present invention Is not limited to this order. It is possible to use any part of the data as valid I/O data. In the embodiment described above, the CPU is a 32-bit CPU, while the storage device is a font card that must be read at units of 32, 16, and 8 bits. However, the present invention is not limited to these specifications. It is also possible to use a 16-bit or 64-bit CPU or the like, and to perform reads of the font card in units of 64 bits or the like to correspond to the type of CPU.

In the embodiment described above, the storage device is a font card. However, the present invention is not limited to this type of storage device, but can also apply to a hard disk card, a font cartridge, and the like.

In the embodiment described above, the present invention is applied to a printer system. However, the present invention can apply to other data processing systems, provided the system uses a storage device that sets the above-described mode registers. Hence, the present invention can apply to such data processing systems as a personal computer, word processor. photocopier. communications device, and the like.

According to the data processing system of the embodiment described above, when a read access is performed for an address area having a second bit width smaller than the first bit width, the address specifying data control device generates at least a portion of the address for accessing stored data having the second bit width and outputs this address portion to the storage device via the connection device, regardless of the address data output from the data processing device. After data is read at the first bit width, valid data of the second bit width is extracted. As a result. storage devices that only allow read accesses at the second bit width can be used with data processing devices that must read data at the first bit width. Hence, the user has an increased selection of storage device types that can be used with the data processing system and can perform a wide variety of data processes by taking advantage of existing resources.

According to the data processing system of the embodiment described above, selection instruction data includes data indicating a portion of the address in the storage device. Therefore, a special address specification corresponding to a specific bit width set according to specifications of the storage device need not be specified using address specifying data of the data processing device. As a result, it is possible to minimize the changes to software.

According to the data processing system of the embodiment described above. the selection instruction data includes data specifying the second bit width. Hence, even when the second bit width of the storage device changes according to the address area, an access can be performed at an appropriate address corresponding to the second bit width set at each area.

According to the data processing system of the embodiment described above, the first bit width is a multiple of the second bit width. The address specifying data control device generates address data at a bit number capable of expressing the multiple value, based on the selection instruction data.

and outputs this address data to an address bus of the storage device via the connection device. Hence, the system can guarantee a reliable data read, even when the data processing device can only perform reads at the first bit width.

According to the data processing system of the embodiment described above, the address specifying data control device generates at least a portion of the data for specifying the address of the partial storage area based on the selection instruction data and data specifying either an even or odd address, and outputs the data to the storage device via the connection device. Hence, it is possible to reliably read data at the second bit width without changing the hardware configuration, even when the second bit width required for the storage device covers a plurality of values.

What is claimed is:

1. A data processing system comprising:

a data processing device that reads process data from an external device at a first bit width per one cycle;

a connection device that connects the data processing device with a storage device when the storage device is mounted in the connection device, wherein the storage device is detachably mounted and has a reduced bus size with which process data is read at a second bit width that is smaller than the first bit width; and an address specifying data control device that outputs via the connection device at least a portion of data specifying an address for a storage area in the storage device, based on prescribed instruction data from the data processing device;

wherein the data processing device comprises:

address specifying data output means for outputting data that specifies an address of a standard storage area, in which at least process data of the first bit width is stored within the storage device, the data of the first bit width being read per one cycle; valid process data extraction means for extracting valid process data of the second bit width based on process data read in one cycle at the first bit width corresponding to data specifying an address, when specifying an address in the standard storage area equivalent to an area of the reduced bus size; and partial storage area selection means for selecting a desired partial storage area in the standard storage area equivalent to an area of the reduced bus size in which data of the second bit width is stored, and outputs selection instruction data, and wherein the address specifying data control device generates at least one part of the data for specifying the address of a partial storage area based on the selection instruction and outputs to the storage device via the connection device.

2. The data processing system according to claim 1, wherein regardless of the address in the storage device that the data processing device specifies with address specifying data, a partial storage area storing data of the second bit width is selected and data of the partial storage area is output.

3. The data processing system according to claim 1, wherein output of the second bit width is performed a plurality of times to form the equivalent of the first bit width.

4. The data processing system according to claim 1 wherein the selection instruction data includes data specifying a portion of the address for the partial storage area.

5. The data processing system according to claim 1, wherein the selection specifying data includes data for specifying the second bit width.

6. The data processing system according to claim 1, wherein the first bit width is a multiple of the second bit width, the address specifying data control means generates address data at a bit number capable of expressing the multiple value, and outputs the address data to an address bus of the storage device via the connection device.

7. The data processing system according to claim 1, wherein the address specifying data control means generates at least a portion of the data for specifying the address of the partial storage area based on the selection instruction data and data specifying either an even or odd address, and outputs the data to the storage device via the connection device.

8. A method for a system including a data processing device that reads data from an external device on a first bit width basis, a storage device detachably mounted to the data processing device and having a memory space for allowing data to be read therefrom on a second bit width basis, the second bit width being smaller than the first bit width, and a control device that identifies data stored in the storage device in response to an instruction from the data processing device, the method comprising the steps of:

(a) specifying a read start address of the storage device;

(b) in accordance with the read start address specified in step (a), the control device identifying data of first bit width in the storage device, the data of first bit width including data of second bit width;

(c) the data processing device reading the data of first bit width identified by the control device in step (b); and (d) the data processing device extracting the data of second bit width from the data of first bit width read in step (c).

9. The method according to claim 8, wherein the first bit width is a multiple of integer of the second bit width.

10. The method according to claim 8, wherein unextracted data produced as a result of extraction in step (d) is discarded.

11. The method according to claim 8, wherein the storage device has a bus connected to the data processing device, the bus having a bus width smaller than the first bit width.

12. The method according to claim 8, wherein the control device applies a control signal to the storage device so that either odd number address data or even number address data is selected with respect to the data of the first bit width identified in step (b).

* * * * *